US008517889B2

(12) United States Patent
Misala

(10) Patent No.: US 8,517,889 B2
(45) Date of Patent: Aug. 27, 2013

(54) ASSEMBLY WITH A PLANETARY GEAR TRAIN FOR A MOTOR VEHICLE, A MOTOR VEHICLE AND A METHOD FOR OPERATING A PLANETARY GEAR TRAIN

(75) Inventor: Andreas Misala, Sachsenheim (DE)

(73) Assignee: Audi AG, Ingolstadt (DE)

( * ) Notice: Subject to any disclaimer, the term of this patent is extended or adjusted under 35 U.S.C. 154(b) by 31 days.

(21) Appl. No.: 13/362,956

(22) Filed: Jan. 31, 2012

(65) Prior Publication Data

US 2013/0029804 A1  Jan. 31, 2013

(30) Foreign Application Priority Data

Feb. 1, 2011  (DE) .......................... 10 2011 010 086

(51) Int. Cl.
*F16H 3/44* (2006.01)
(52) U.S. Cl.
USPC ....................................................... 475/322
(58) Field of Classification Search
None
See application file for complete search history.

(56) References Cited

U.S. PATENT DOCUMENTS

| 6,250,276 | B1 | 6/2001 | Boll |
| 6,832,970 | B2 | 12/2004 | Eibler |

FOREIGN PATENT DOCUMENTS

| DE | 198 22 426 | 11/1999 |
| DE | 199 41 705 | 3/2000 |
| DE | 102006053139 A1 | 5/2008 |
| EP | 1 282 772 | 2/2003 |
| EP | 1 459 931 A1 | 9/2004 |
| EP | 1 555 456 A2 | 7/2005 |
| GB | 2348630 | 10/2000 |
| JP | 2004-245316 | 9/2004 |
| JP | 148133 U | 12/2010 |
| WO | WO 2010/144753 | 12/2010 |

*Primary Examiner* — Dirk Wright
(74) *Attorney, Agent, or Firm* — Henry M Feiereisen LLC

(57) ABSTRACT

In an assembly with a planetary gear train, which includes the elements sun gear, planet carrier with planetary gears and ring gear, two elements, in particular the sun gear and the planet carrier, are coupled with each other via an overrunning clutch. A clutch bridges the overrunning clutch. Bridging is discontinuous and controlled by a control device based on the relative rotation of the two elements to be coupled. For example, one rotation speed sensor can measure the rotation speed of an electric machine, whereas another rotation speed sensor can measure the rotation speed of a crankshaft of an combustion engine. In a motor vehicle, the combustion engine can be coupled with an electric machine, using different gear ratios during startup or boosting and in generator operation. In addition, the electric machine can drive an air-conditioning compressor when the combustion engine is not running.

17 Claims, 5 Drawing Sheets

ASSEMBLY WITH A PLANETARY GEAR TRAIN FOR A MOTOR VEHICLE, A MOTOR VEHICLE AND A METHOD FOR OPERATING A PLANETARY GEAR TRAIN

CROSS-REFERENCES TO RELATED APPLICATIONS

This application claims the priority of German Patent Application, Serial No. 10 2011 010 086.5, filed Feb. 1, 2011, pursuant to 35 U.S.C. 119(a)-(d), the content of which is incorporated herein by reference in its entirety as if fully set forth herein.

BACKGROUND OF THE INVENTION

The present invention relates to an assembly with a planetary gear train which can be used in a motor vehicle. The planetary gear train has the following elements: a sun gear, a planet carrier with planetary gears configured for rotation about the sun gear, and a ring gear surrounding the planetary gears. All three elements are typically able to rotate, unless one element is locked in place.

The following discussion of related art is provided to assist the reader in understanding the advantages of the invention, and is not to be construed as an admission that this related art is prior art to this invention.

It is known to use a planetary gear train for coupling an electric machine with an combustion engine in a motor vehicle. The planetary gear train enables different gear ratios between the electric machine and the combustion engine. Optionally, other units, for example a compressor for an air-conditioning system of the motor vehicle, can be additionally provided. The compressor may hereby be coupled with the electric machine via a belt drive, wherein the belt drive is used at the same time to for couple the electric machine to the sun gear of the planetary gear train.

Because the electric machine and the combustion engine should be able to operate independently in some operating modes, it is known to arrange in the planetary gear train an overrunning clutch between two predetermined (selected) elements. If, for example, the crankshaft of the combustion engine is coupled with the planet carrier and the sun gear is coupled with a pulley for the belt drive which implements coupling with the electric machine, then the sun gear and the planet carrier are the two selected elements which are coupled with each other via an overrunning clutch. The transmission direction of the overrunning clutch hereby runs from the planet carrier to the sun gear, i.e. from the crankshaft to the pulley and the belt and hence to the rotor of the electric machine. The electric machine can then overtake the combustion engine, i.e. rotate with a higher rotation speed than the rotation speed of the combustion engine, multiplied with the gear ratio of the gear.

However, an overrunning clutch also has disadvantages. During the operation of the combustion engine, the rotation speed can vary due to excitations from a finite number of combustion chambers. As a result, the overrunning clutch may then continuously briefly open and close. This increases the wear of the overrunning clutch. Moreover, this operation of the overrunning clutch may also produce irritating noise.

It would therefore be desirable and advantageous to obviate prior art shortcomings and to provide an improved assembly with a planetary gear train and an overrunning clutch between two selected elements of the planetary gear train.

SUMMARY OF THE INVENTION

According to one aspect of the present invention, a planetary drive assembly includes a sun gear, a planet carrier, planetary gears, and a ring gear, and furthermore an overrunning clutch coupling the sun gear and the planet carrier with one another. An additional a clutch is configured to couple the sun gear and the planet carrier directly with each other in parallel with the overrunning clutch. A first measuring device measures at least indirectly a rotation speed of the sun gear, and a second measuring device measures at least indirectly a rotation speed of the planet carrier. A control device receives measurement signals from the first and second measuring devices and closes the clutch in response to at least one predetermined condition relating to at least one of the measured rotation speeds.

According to another aspect of the invention, a motor vehicle includes a planetary drive assembly which has a sun gear, a planet carrier, planetary gears, and a ring gear, and furthermore an overrunning clutch coupling the sun gear and the planet carrier with one another. An additional a clutch is configured to couple the sun gear and the planet carrier directly with each other in parallel with the overrunning clutch. A first measuring device measures at least indirectly a rotation speed of the sun gear, and a second measuring device measures at least indirectly a rotation speed of the planet carrier. A control device receives measurement signals from the first and second measuring devices and closes the clutch in response to at least one predetermined condition relating to at least one of the measured rotation speeds. A pulley in the assembly may be coupled with the sun gear. An combustion engine of the motor vehicle may be coupled with the planet carrier, whereas an electric machine may be coupled with the sun gear via a belt drive which includes this pulley. This assembly has the advantage that the electric machine can be particularly well coupled via the belt drive and can hence be arranged at a suitable location in the engine compartment of the motor vehicle. The ring gear, which is directly coupled neither with the electric machine nor with the combustion engine, can then freely rotate or can be locked. This embodiment can be constructed in a particularly compact form, in particular when the armature that can be pulled in with an electromagnet forms a part of the ring gear.

According to yet another aspect of the invention, a method for operating a planetary gear train includes the steps of connecting a planet carrier and a sun gear of the planetary gear train with each other via an overrunning clutch (having a transmission direction in particular from the planet carrier to the sun gear), and closing a clutch arranged between the planet carrier and the sun gear when a rotation speed of the planet carrier is equal to a rotation speed of the sun gear within a predetermined limit (as defined by a predetermined criterion). For example, the clutch may be closed when the rotation speeds deviate maximally by a predetermined value which is identical for all rotation speeds, or which alternatively depends on the rotation speed of the planet carrier or of the sun gear.

In the assembly according to the invention, two selected elements are not only coupled with one another via an overrunning clutch, but are simultaneously also coupled with each other directly via a clutch directly. The clutch functions to bridge the overrunning clutch. It is understood the clutch may not be closed directly in each and every operating situation. For this reason, the assembly includes devices for at least indirectly measuring a respective rotation speed of the two selected elements. For example, the rotation speed of an element that is coupled with the electric machine via a belt drive can be determined based on the rotation speed of the electric machine, wherein the rotation speed of the respective element is then derived from the measured rotation speed multiplied by the gear ratio of the belt drive. Because the rotation speeds of the two selected elements are known, a control device which receives the measurement signals from the measuring devices can then be configured to close the clutch in response to at least one predetermined condition relating to at least one of the measured rotation speed values.

In other words, the clutch is actually closed by the control device when the operating state of the planetary gear train requires coupling between the two selected elements and when this coupling is possible with the configuration of the clutch, without damaging the clutch or other elements of the assembly.

According to another advantageous feature of the present invention, the predetermined condition may provide that the rotation speeds of the two selected elements deviate from one another by at most a maximum value. The maximum value may be an absolute value of a rotation speed difference between the two selected elements, in which case the control can be particularly easily realized with the control device. However, the maximum value may also depend on the rotation speed of one of the two elements; for example, the maximum value may be a percentage of the rotation speed, wherein the percentage is always the same, or the maximum value may be stored in a corresponding table in a memory associated with the control device.

According to another advantageous feature of the present invention, one of the two selected elements may be the planet carrier. The element that is not part of the two predetermined (selected) elements, i.e. the ring gear when the selected element is the sun gear, can be coupled with a non-rotatable component particularly via an additional clutch or a brake, for example in the assembly in a motor vehicle with a component that is fixed in relation to the combustion engine.

According to another advantageous feature of the present invention, the second selected element may be the sun gear.

According to another advantageous feature of the present invention, the clutch may be constructed as follows: a ring is connected with the sun gear, and a permanent magnet which is pressed by a (leaf) spring against the ring is connected with the planet carrier. The assembly includes an electromagnet for the clutch, wherein the electromagnet can pull the permanent magnet away from the ring. With the electromagnet, the clutch can be constructed particularly as an electrically controllable clutch, which facilitates the cooperation with the control device. Because the clutch must be closed in most or in the most frequent operating states, the clutch is closed in the base state by initially coupling the planet carrier with the sun gear when current does not flow through the electromagnet.

According to another advantageous feature of the present invention, the ring may be a friction ring, i.e. the permanent magnet may be frictionally connected with the sun gear or the ring.

Alternatively, the ring may engage the permanent magnet with a form fit, wherein for example a tooth pattern may be formed on the ring and on the permanent magnet (thereby providing a toothed coupling), or wherein alternatively a claw-type coupling may be provided.

According to another advantageous feature of the present invention, the ring gear may be constructed for radial displacement in order to provide different gear ratios with the gear. In the present embodiment, the ring gear may have an armature (which is more particularly constructed as a single piece with the remaining ring gear), and the assembly may include an electromagnet for the additional clutch, with which the armature can be pulled in and hence the ring gear can be displaced. With this embodiment, the ring gear can advantageously rotate freely in a base state and is only locked on an additional component (e.g., a component that is fixed relative to the combustion engine) when current flows through the respective electromagnet.

According to an advantageous feature of the present invention, the sun gear may be connected with a pulley. The pulley may be part of a belt drive, with which for example an electric machine is coupled to the planet gear. This may be necessary in some situations where installation space in a motor vehicle is tight, so that the electric machine cannot be arranged as an extension of the combustion engine, but must be arranged on the side of the combustion engine.

For optimum use of the installation space, both electromagnets may be arranged in the aforedescribed preferred embodiments directly radially inside the pulley, i.e. directly adjacent to the pulley, namely radially inwardly, so that the pulley surrounds the entirety formed of the planet gear and the clutches with the electromagnets and is thus able to seal them altogether with additional cover elements. Arranging the electromagnets and hence also the permanent magnet and the armature radially outside of the core piece of the planet gear is advantageous because the planet gear can then be constructed in a compact form. Each of the electromagnets essentially includes a coil and a soft-magnetic coil body as carrier of the coil and for field enhancement. This coil body can also be constructed so as to accommodate two coils on a common, especially shaped coil body.

According to another advantageous feature of the present invention, the planet carrier may be coupled with a shaft, on which a vibration damping or vibration elimination unit is disposed outside the planetary drive, which dampens and/or eliminates the vibrations of the shaft.

Such vibration damping or vibration elimination units are generally known. According to a preferred embodiment, this unit may be coupled directly to the particular shaft which can introduce torque and hence also vibrations.

The oscillation damping unit includes in a conventional manner, for example, a support plate which rotates in unison with the shaft and a metallic damping ring which is coupled to the support plate and absorbs the vibrations. The damping ring may hereby be coupled, for example, via an elastic material such as rubber; however, the damping ring may also be supported in a viscous oil.

According to another advantageous feature of the present invention, a rotation speed counter may be employed to measure the rotation speed of a rotor of the electric machine and hence at least indirectly measure the rotation speed of the sun gear. Conversely, the rotation speed of a crankshaft and hence the rotation speed of the planet carrier may be measured directly. Arranging the rotation speed counter on the electric machine is less complex than on a sun gear inside the gear, because it is undesirable to introduce an excessive number of cables into the gear.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1A:
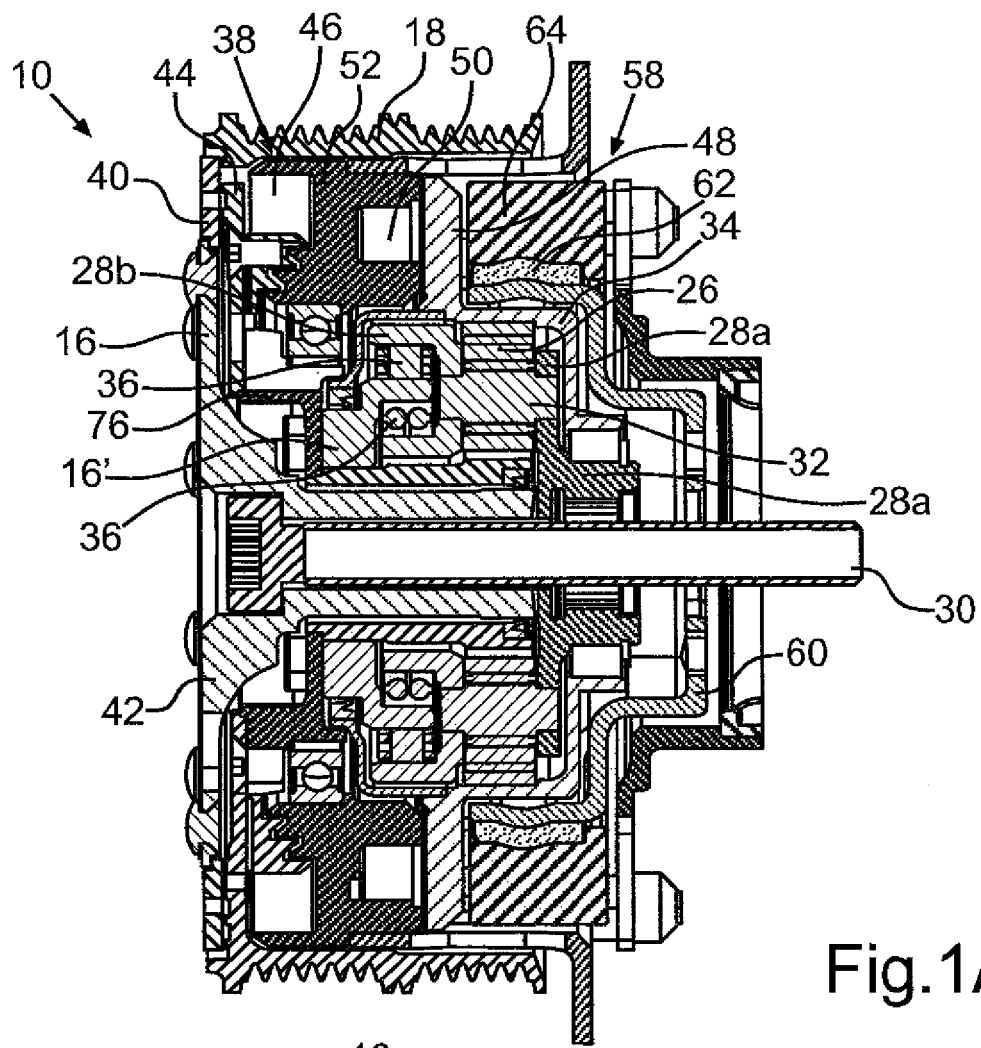
FIG. 1A is an axial cross-section of an assembly according to the present invention in an, FIG. 1B is a schematic diagram of an assembly according to the present invention with attached components of an automobile according to the invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown an assembly, generally designated with reference numeral 10 for coupling an combustion engine 12 with an electric machine 14. The assembly 10 includes, in particular, a planet gear with a sun gear 16 carrying a pulley 18. The pulley 18 is part of a belt drive 20 with a belt 22 and a pulley 24 which rotates in unison with a rotor (not illustrated in the Figure) of the electric machine 14. The electric machine 14 is thus coupled with the sun gear 16 via the belt drive 20. The planetary gear train 10 further includes a plurality of planetary gears 26, for example four planetary gears in the present embodiment, which are coupled with each other via a planet carrier or land 28. The planet carrier includes two parts; one part 28a coupled with the crankshaft 30 of the combustion engine 12, and the second part 28b disposed on the side of the sun gear. The two parts 28a and 28b are connected with each other via the planet wheels 26, namely via a respective pin 32 passing through each of the planet wheels 26. The planet gear also includes a ring gear 34.

In the present embodiment, the sun gear 16 is coupled with an element 16' which rotates in unison with the sun gear 16; an overrunning clutch 36 is arranged between the element 16' and the second part of the planet carrier 28b. The overrunning clutch 36 is oriented such that its transmission direction extends from the crankshaft 30 to the belt drive 20, i.e. from the combustion engine 12 to the electric machine 14, whereas the electric machine 14 is able to overtake the combustion engine 12.

In the present embodiment, a first clutch 38 with which the crankshaft 30 can be directly coupled with the sun gear is arranged in parallel with the overrunning clutch 36. The clutch 38 is constructed such that a friction ring 40 is connected with the sun gear 16, see FIG. 1A. A permanently magnetized disk 44 is pressed against the friction wheel 40 by a leaf spring 42. The permanently magnetized disk 44 is pulled away from the friction disk 40 by the force from a first electromagnet 46 opposing the force from the leaf spring 42, thereby opening the clutch. The clutch 38 is thus closed in the base state, when the electromagnet 46 is not excited, see FIG. 1B.

In the present embodiment, the ring gear 34 is designed for axial displacement. An armature 48, which extends over the same radial range as the friction disk 40 and the permanently magnetized disk 44, is formed as one-piece with the ring gear. An additional electromagnet 50 can then be provided directly next to the electromagnet 46, i.e., an additional second winding may be disposed on a coil body 52; this additional permanent magnet can then pull in the armature 48 and hence lock the ring gear 46. This is illustrated in FIG. 1B by a clutch (or brake) 54 which is open in the base state—when the electromagnet 50 is not excited—and which can connect the ring gear 34 to a component 56 of the motor vehicle that is fixed in relation to the combustion engine.

Figure 1B:
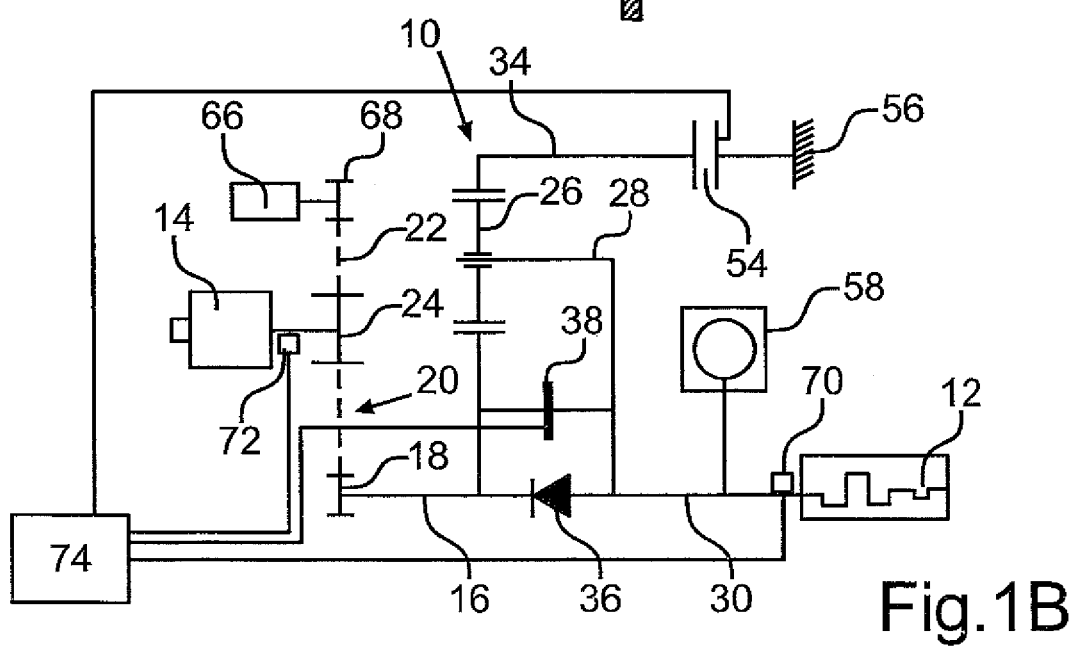

The assembly of FIG. 1A further includes a damper assembly 58 which includes a support plate 60 that is directly coupled with the crankshaft 30, i.e. on the side of the combustion engine before the planetary gear train; the support plate 60 has a rubber-elastic mass 62 which in turn holds a steel ring 64 capable of rotating in unison with the support plate 60 and of simultaneously absorbing and damping vibrations.

A part of the assembly in the motor vehicle is a compressor 66 for an air-conditioning (AC) system of the motor vehicle, which has a pulley 68 and is therefore part of the belt drive 22 and thus coupled to both the electric machine 14 and the sun gear 16. The AC compressor 66 can then be operated by both the combustion engine 12 as well as by the electric machine 14.

While the motor vehicle is operating, the clutch 38 can not always be directly closed or directly opened. Instead, the clutch 38 has the function of bridging the overrunning clutch 36 when the overrunning clutch would otherwise be subject to excessive dynamic loads and/or would operate with excessive noise. The clutch 38 can be closed at certain rotation speed ratios between the rotation speed of the crankshaft 30 and the rotation speed of the sun gear 16 with the pulley 18. This provides a rotation speed counter 70 for measuring the rotation speed of the crankshaft 30. In the present embodiment, instead of measuring the rotation speed of the sun gear 16 directly, the rotation speed of a rotor of the electric machine 14 or of the pulley 24 is measured with a rotation speed counter 72. The rotation speed of the sun gear 16 can be derived from the rotation speed measured with the rotation speed counter 72 through division by the gear ratio of the belt drive 20. Part of the assembly in the motor vehicle according to FIG. 1B is a control device 74 which is designed to excite the two electromagnets 46 and 50 and to thereby open the clutch 38 or to close the clutch by de-exciting the electromagnet 46, and to also close the clutch 54 (by exciting the electromagnet 50) or to open the clutch 54 again (by de-exciting the electromagnet 50).

The control device 74 causes the following operating states, described hereinafter with reference to FIGS. 2A to 5, to be established in the motor vehicle under suitable conditions.

In a starting operating state, the combustion engine 12 is started with assistance from the electric machine 14; in this case, the electric machine 14 is simply the starter motor for the combustion engine 12.

Figure 2A:
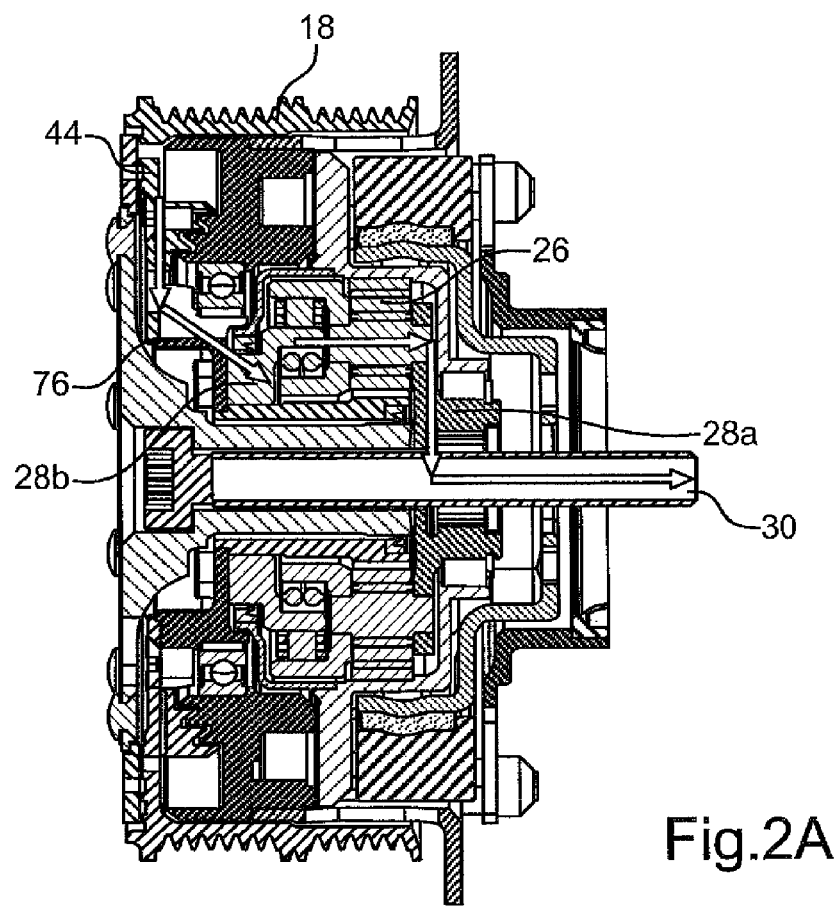
FIG. 2A is based on the cross-sectional diagram of FIG. 1A, the flux of force which occurs when an combustion engine is started by an electric machine with the assembly according to 1B.
Figure 2B:
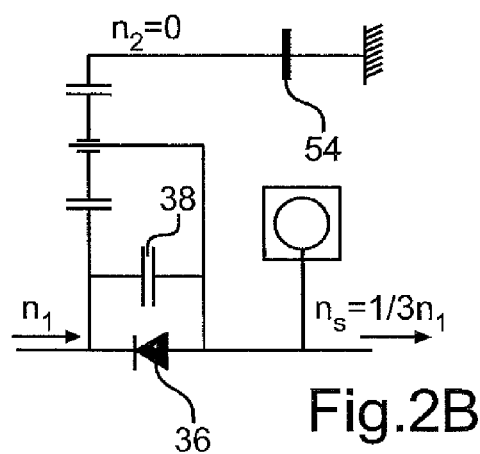
FIG. 2B is a schematic diagram relating hereto.
Figure 2C:
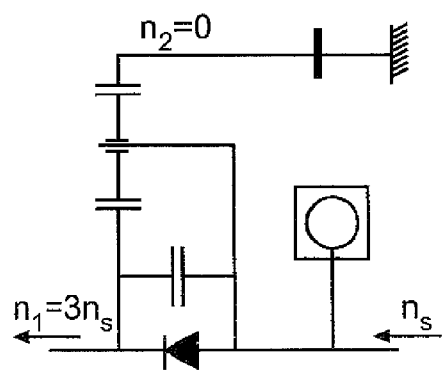
FIG. 2C is a schematic diagram showing how, when the flux of force according to FIG. 2A is exact reversed, the electric machine can be operated as a generator with a selected gear ratio of 3:1.
Figure 3A:
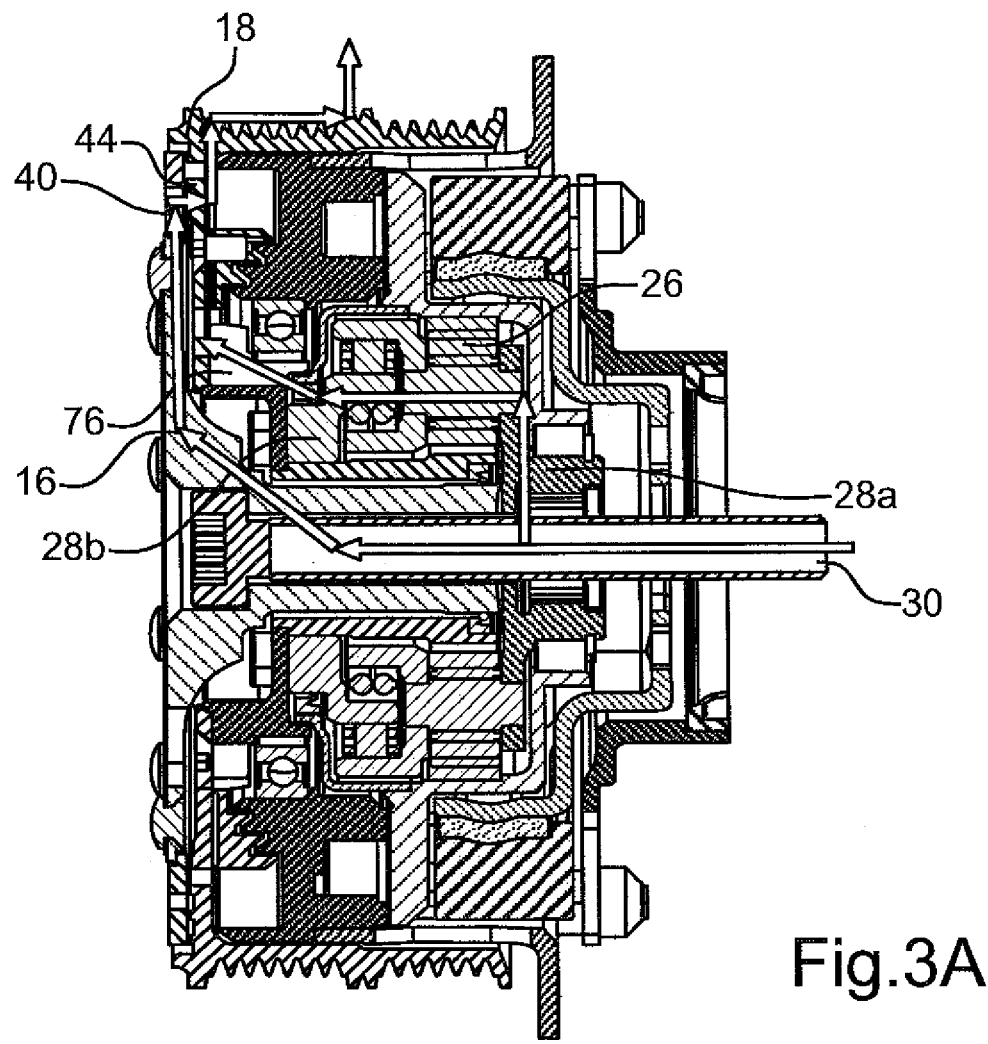
FIG. 3A is with reference to the cross-sectional drawing of FIG. 1A, the flux of force which occurs when the electric machine is operated as a generator with a gear ratio 1:1.
Figure 3B:
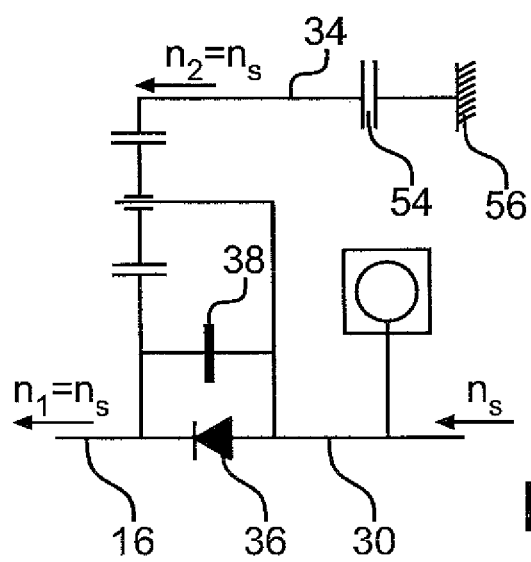
FIG. 3B is a schematic diagram relating hereto.
Figure 4A:
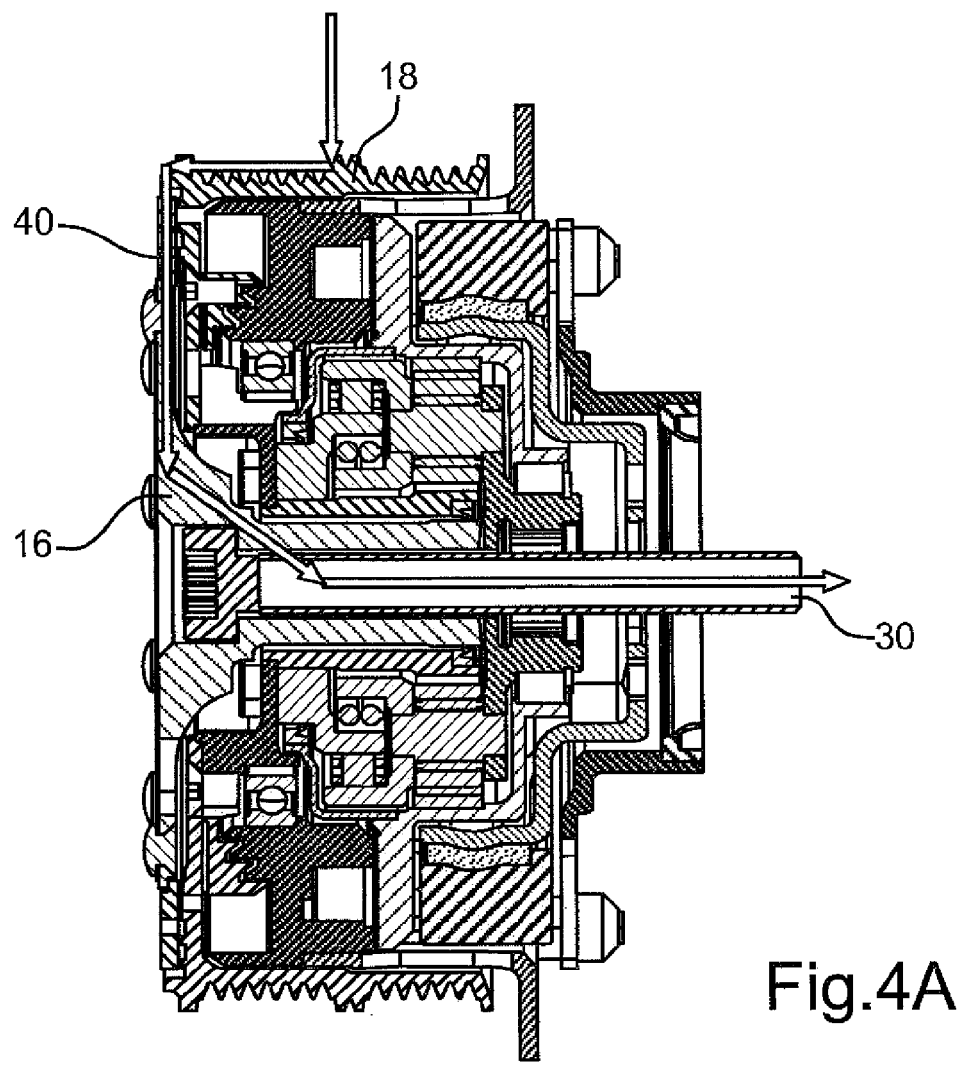
FIG. 4A is based on the cross-sectional diagram of FIG. 1A, the flux of force which occurs when the combustion engine is boosted by the electric machine.
Figure 4B:
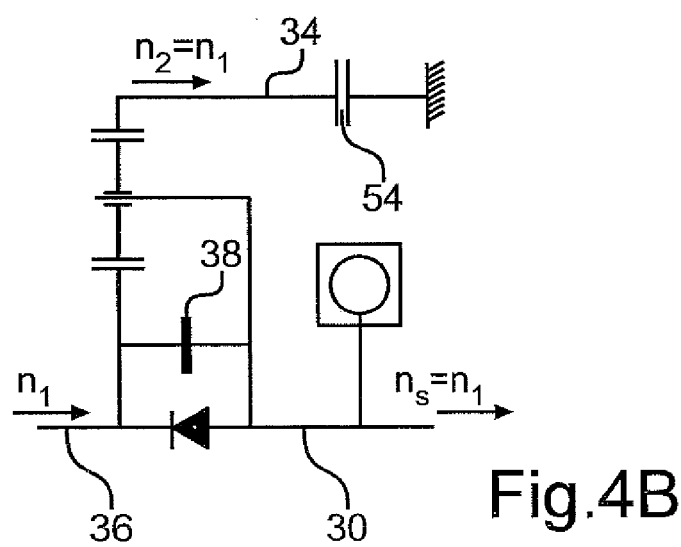
FIG. 4B is a schematic diagram relating hereto.
Figure 5:
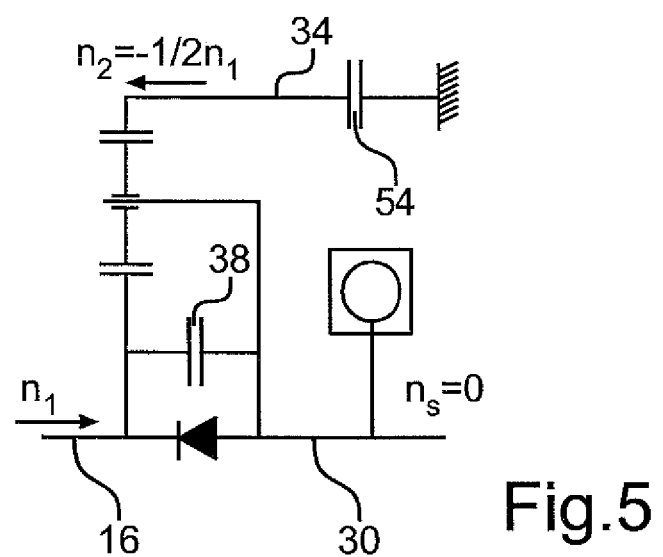
FIG. 5 is a schematic diagram illustrating how the rotation speeds adjust, when an additional unit is operated by the electric machine with the combustion engine at rest.

As seen in FIG. 2B, the first clutch 38 is opened by exciting the electromagnet 46 and the second clutch 54 is closed by exciting the electromagnet 50.

The flux of force is transmitted from the pulley 18 via the permanently magnetized disk 44 and a coupling piece 46 into the second part of the planet carrier 28b, via the planetary gears 26 into the first part 28a of the planet carrier and hence into the crankshaft 30, because the overrunning clutch 36 is blocking in this situation. At a rotation speed $n_1$ with which the sun gear rotates, the planetary carrier rotates, when the gear ratio between the sun gear and the planet is about 3, with a rotation speed $n_s = \frac{1}{3} n_1$. The electric machine 14 can then rotate significantly faster than the combustion engine 12 which still needs to be set into rotation. Advantageously, the generated torque is tripled because the rotation speed is only one third. However, a particularly high torque is required for starting the combustion engine.

The ring gear does not co-rotate; its rotation speed $n_2$ is therefore equal to 0.

When reversing the effective direction of the arrows in FIG. 2A, the combustion engine which rotates with a rotation speed $n_s$ may operate the electric machine which then operates as a generator. The rotation speed $n_1$ of the electric machine is then $=3 \cdot n_s$, see FIG. 2C.

When the electric machine is operated as a generator, it may be more advantageous if the rotation speed of the electric machine is not extremely high. The factor 3 is too large particularly at higher rotation speeds of the combustion engine. According to FIG. 3B, the first clutch 38 is closed in this situation while the second clutch 54 is simultaneously open. When the first clutch 38 is closed, the sun gear is directly coupled with the crankshaft 30. Because the ring gear 34 is now decoupled from the component 56 which is fixed relative to the combustion engine, it can freely rotate. The flux of force then propagates over two parallel paths, namely on one hand directly from the crankshaft 30 via the overrunning clutch 36 to the sun gear 16, from here via the friction disk 40 and the permanently magnetized disk 44 to the pulley 18. In the parallel path, the force is transmitted via the first planet carrier part 28a, the planetary gears 26 and the two planet carriers 28b, the coupling piece 76 and finally also via the permanently magnetized plate 44 to the pulley 18. The overrunning clutch 36 is then bridged.

The combustion engine can also be boosted by the electric motor with a gear ratio 1:1, when the two clutches 38 and 54 (FIG. 4B) are in the same position as in the generator operation with the gear ratio of 1:1. The rotation speeds of the sun gear 16 and of the crankshaft 30 are hereby also identical. The ring gear 34 can freely rotate. The flux of force propagates via the pulley 18, the friction plate 40 and the sun gear 16 to the crankshaft 30. Boosting may occur during ongoing operation of the motor vehicle for supporting the combustion engine, for example during rapid acceleration or to reduce fuel consumption. Boosting may otherwise also occur when the combustion engine is being shut down or has already been shut down and the crankshaft 30 rotates only at a low rotation speed: the electric machine can then accelerate the sun gear rapidly from the current operation to the rotation speed of the crankshaft 30, and the first clutch 38 can be briefly closed.

Another operating state of the assembly 10 is the so-called stationary air-conditioning: with stationary air-conditioning, the compressor 66 for the AC system is driven by the electric machine 14 via the belt drive 20, while the combustion engine 12 is shut down. Both clutches 38 and 44 are then opened, allowing the crankshaft 30 to stand still (rotation speed $n_s=0$), while the sun gear 16 at the same time rotates with a rotation speed $n_1$. The ring gear 34 then rotates with half of the opposite rotation speed $n_2 = -\frac{1}{2} n_1$. (The flux of force need not be illustrated for this situation).

With the aforedescribed assembly 10, the combustion engine can be started by the electric machine with a gear ratio of 3:1 and boosted with a gear ratio of 1:1. Conversely, the electric machine can be operated as a generator which rotates with a selected gear ratio of 1:3 or 1:1. Lastly, the electric machine enables stationary air-conditioning when the combustion engine is turned off. In particular, the clutch 38 bridges and hence relieves the overrunning clutch 36, because the flux of force does then not exclusively propagate via the overrunning clutch. This reduces wear and noise.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. An assembly, comprising:
    a planetary gear train having a ring gear, a sun gear, a plurality of planetary gears rotatably mounted on a planet carrier and interacting with the ring gear and the sun gear;
    an overrunning clutch coupling the sun gear and the planet carrier with one another;
    a clutch configured to couple the sun gear and the planet carrier directly with each other in parallel with the overrunning clutch;
    a first measuring device measuring at least indirectly a rotation speed of the sun gear;
    a second measuring device measuring at least indirectly a rotation speed of the planet carrier; and
    a control device configured to receive measurement signals from the first and second measuring devices and to close the clutch in response to at least one predetermined condition relating to at least one of the measured rotation speeds.

2. The assembly of claim 1, wherein the at least one predetermined condition provides that the rotation speeds of the sun gear and the planet carrier deviate from each other by at most a maximum value which preferably depends on the rotation speed of one of the sun gear and the planet carrier.

3. The assembly of claim 1, wherein the ring gear is coupled with a non-rotatable component via an additional clutch.

4. The assembly of claim 3, further comprising a ring connected with the sun gear and a permanent magnet connected with the planet carrier, wherein the permanent magnet is pressed against the ring by a spring, and an electromagnet operatively connected with the clutch, with electromagnet configured to pull the permanent magnet away from the ring.

5. The assembly of claim 4, wherein the ring is a friction ring.

6. The assembly of claim 4, wherein the ring and the permanent magnet are constructed with a mutual form fit.

7. The assembly of claim 3, wherein the ring gear is axially displaceable and comprises an armature, further comprising an additional electromagnet operatively connected to the additional clutch, wherein additional electromagnet pulls in the armature and displaces the ring gear.

8. The assembly of claim 1, further comprising a pulley connected with the sun gear.

9. The assembly of claim 3, wherein an electromagnet operatively connected with the clutch and an additional electromagnet operatively connected with the additional clutch are arranged directly radially inside the pulley.

10. The assembly of claim 9, wherein the electromagnet and the additional electromagnet comprise windings wound on a common coil body.

11. The assembly of claim 1, further comprising a shaft coupled with the planet carrier, and a vibration damping unit or a vibration elimination unit disposed on the shaft outside the planetary drive for damping or eliminating vibrations of the shaft.

12. The assembly of claim 11, wherein the vibration damping unit comprises a support plate and a metallic damping ring coupled with the support plate.

13. A motor vehicle, comprising:
- a combustion engine;
- an electric machine;
- a planetary gear train having a ring gear, a sun gear, a plurality of planetary gears rotatably mounted on a planet carrier and interacting with the ring gear and the sun gear, said planet carrier coupled to the combustion engine;
- a belt drive having a pulley and coupling the electric machine with the sun gear,
- an overrunning clutch coupling the sun gear and the planet carrier with one another,
- a clutch configured to couple the sun gear and the planet carrier directly with each other in parallel with the overrunning clutch,
- a first measuring device measuring at least indirectly a rotation speed of the sun gear,
- a second measuring device measuring at least indirectly a rotation speed of the planet carrier, and
- a control device configured to receive measurement signals from the first and second measuring devices and to close the clutch in response to at least one predetermined condition relating to at least one of the measured rotation speeds.

14. The motor vehicle of claim 13, further comprising a rotation speed counter configured to measure a rotation speed of a rotor of the electric machine and thus indirectly determine the rotation speed of the sun gear.

15. A method for operating a planetary gear train, comprising:
- connecting a planet carrier and a sun gear of the planetary gear train with each other via an overrunning clutch, and
- closing a clutch arranged between the planet carrier and the sun gear when a rotation speed of the planet carrier is equal to a rotation speed of the sun gear within a predetermined limit.

16. The method of claim 15, wherein the clutch is closed, when the rotation speeds of the planet carrier and the sun gear deviate from each other maximally by a predetermined value which is independent of the rotation speeds.

17. The method of claim 15, wherein the clutch is closed, when the rotation speeds of the planet carrier and the sun gear deviate from each other maximally by a predetermined value which depends on the rotation speed of the planet carrier or on the rotation speed of the sun gear.

* * * * *